(12) United States Patent
Toyoizumi et al.

(10) Patent No.: US 11,363,824 B2
(45) Date of Patent: Jun. 21, 2022

(54) OIL-IN-WATER DISPERSION TYPE OIL-CONTAINING LIQUID FOOD

(75) Inventors: Satoshi Toyoizumi, Toyonaka (JP); Yasuyuki Morita, Toyonaka (JP)

(73) Assignee: SAN-EI GEN F.F.I., INC., Osaka (JP)

(*) Notice: Subject to any disclaimer, the term of this patent is extended or adjusted under 35 U.S.C. 154(b) by 392 days.

(21) Appl. No.: 14/007,887

(22) PCT Filed: Mar. 29, 2012

(86) PCT No.: PCT/JP2012/058411
§ 371 (c)(1),
(2), (4) Date: Sep. 26, 2013

(87) PCT Pub. No.: WO2012/133672
PCT Pub. Date: Oct. 4, 2012

(65) Prior Publication Data
US 2014/0017385 A1  Jan. 16, 2014

(30) Foreign Application Priority Data

Mar. 29, 2011 (JP) .............................. JP2011-072597
May 13, 2011 (JP) .............................. JP2011-108807

(51) Int. Cl.
| | | |
|---|---|---|
| A23D 7/005 | (2006.01) | |
| A23L 23/00 | (2016.01) | |
| A23L 29/262 | (2016.01) | |
| A23L 27/00 | (2016.01) | |
| A23L 29/269 | (2016.01) | |
| A23L 29/256 | (2016.01) | |
| A23L 29/238 | (2016.01) | |

(52) U.S. Cl.
CPC ............ *A23D 7/0053* (2013.01); *A23L 23/00* (2016.08); *A23L 27/00* (2016.08); *A23L 29/238* (2016.08); *A23L 29/256* (2016.08); *A23L 29/262* (2016.08); *A23L 29/269* (2016.08); *A23L 29/27* (2016.08); *A23L 29/272* (2016.08)

(58) Field of Classification Search
CPC ...... A23L 1/0534; A23L 23/00; A23L 29/262; A23L 29/256; A23L 29/272; A23L 29/269; A23L 27/00; A23L 29/27; A23L 29/238; A23D 7/0053
See application file for complete search history.

(56) References Cited

FOREIGN PATENT DOCUMENTS

| | | |
|---|---|---|
| JP | S62-83854 | 4/1987 |
| JP | H02-227045 | 9/1990 |
| JP | H02-227046 | 9/1990 |
| JP | H02227046 | * 9/1990 |
| JP | H03157402 | * 7/1991 |
| JP | 2734062 | 3/1998 |
| JP | 2743442 | 4/1998 |
| JP | 11302448 | * 11/1999 |
| JP | 2000-512850 A | 10/2000 |
| JP | 2004-159530 | 6/2004 |
| JP | 2004305005 | * 11/2004 |
| JP | 2005-095061 | 4/2005 |
| JP | 2005-253425 | 9/2005 |
| JP | 3783092 | 6/2006 |
| JP | 2007-159571 | 6/2007 |
| JP | 2007-330256 A | 12/2007 |
| JP | 2008-289388 | 12/2008 |
| WO | 1997/048402 A1 | 12/1997 |

OTHER PUBLICATIONS

Esa et al "Overview of Bacterial Cellulose Production and Application" Agriculture and Agricultural Science Procedia 2 (2014), pp. 113-119 https://www.sciencedirect.com/science/article/pii/S2210784314000187.*
Wikipedia "Bacterial Cellulose" printed Apr. 13, 2018 pp. 1-12 https://en.wikipedia.org/wiki/Bacterial_cellulose.*
USDA "Report 45179321 Soy milk, UPC: 025293600270" p. 1 printed Feb. 2019 https://ndb.nal.usda.gov/ndb/foods/show/45179321?fgcd=&manu=&format=&count=&max=25&offset=&sort=default&order=asc&qlookup=soy+milk&ds=&qt=&qp=&qa=&qn=&q=&ing=.*
Perrechil et al "Rheological and structural evaluations of commercial Italian salad dressings" Food Science and Technology Jun. 2010 pp. 1-10 http://www.scielo.br/scielo.php?script=sci_arttext&pid=S0101-20612010000200027 (Year: 2010).*
International Search Report issued for International Application No. PCT/JP2012/058411 dated Jul. 3, 2012, pp. 1-4.
Huang-Chan Huang et al., "In situ modification of bacterial cellulose network structure by adding interfering substances during fermentation," Bioresource Technology 101 (2010), pp. 6084-6091.

* cited by examiner

*Primary Examiner* — Vera Stulii
(74) *Attorney, Agent, or Firm* — Hamre, Schumann, Mueller & Larson, P.C.

(57) ABSTRACT

Provided is a food that has a combination of the respective advantages of a surfactant-containing emulsified food and a non-dispersion-type oil-containing liquid food. Specifically, the object is to provide an oil-in-water dispersion-type oil-containing liquid food having stability (stability of oil droplet dispersion) comparable to that of a surfactant-containing emulsified food, while providing a sharp flavor release similar to that of a non-dispersion-type oil-containing liquid food. An oil-in-water dispersion-type oil-containing liquid food or similar food to be provided includes water, oil, a three-dimensional network structure substantially consisting of fine cellulose, and at least one polysaccharide selected from the group consisting of native gellan gum, xanthan gum, iota-carrageenan, and guar gum. This food substantially does not contain a surfactant, and droplets of the oil are stably dispersed in the water.

10 Claims, 3 Drawing Sheets

DRAWINGS
[Fig.1]
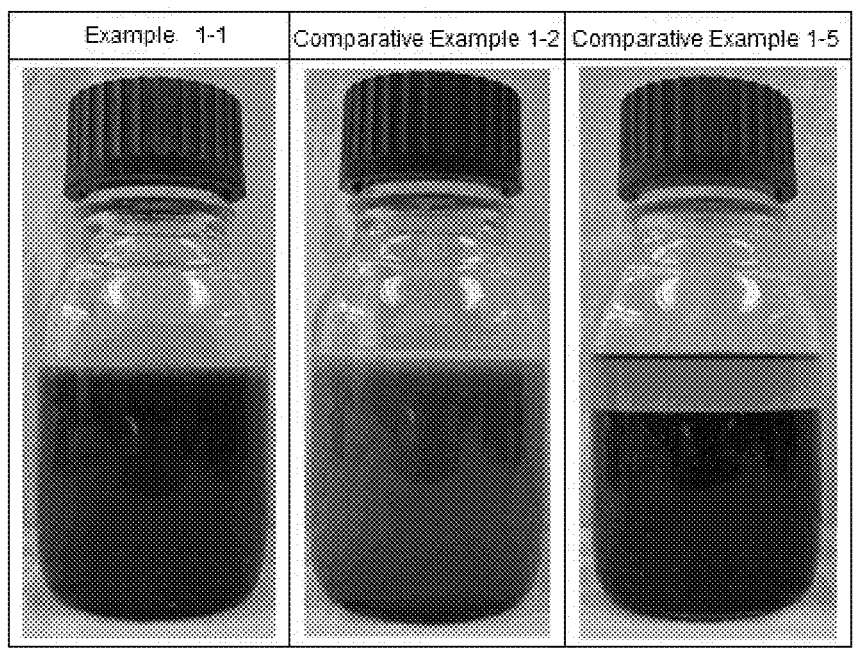

[Fig.2]
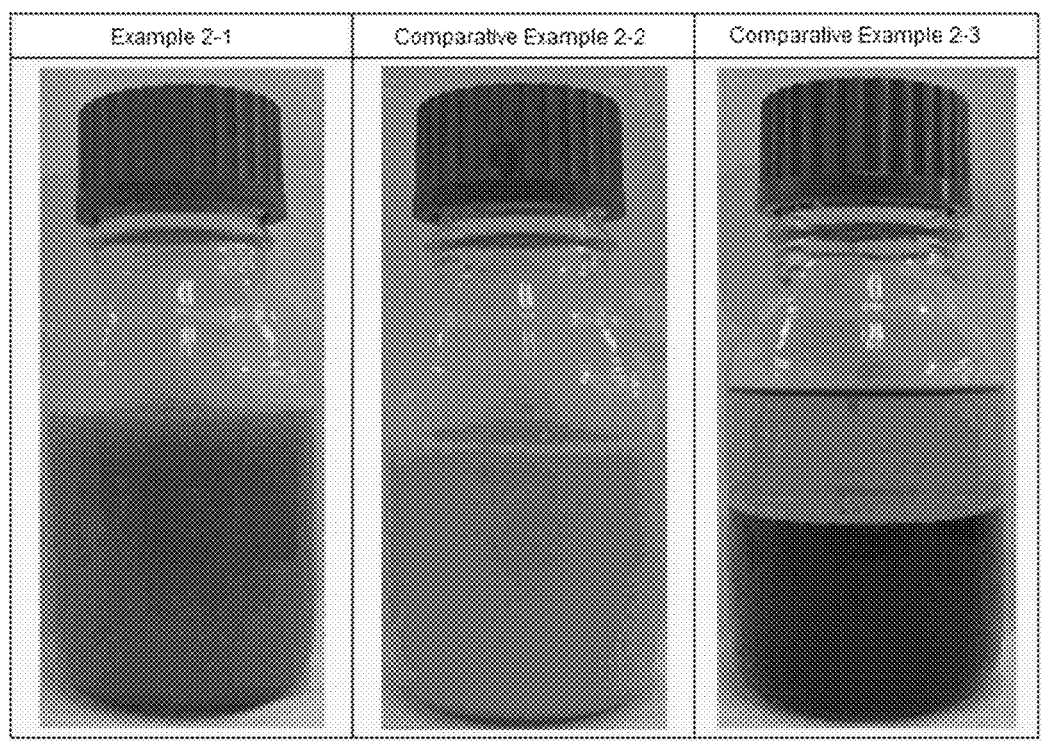

[Fig.3]
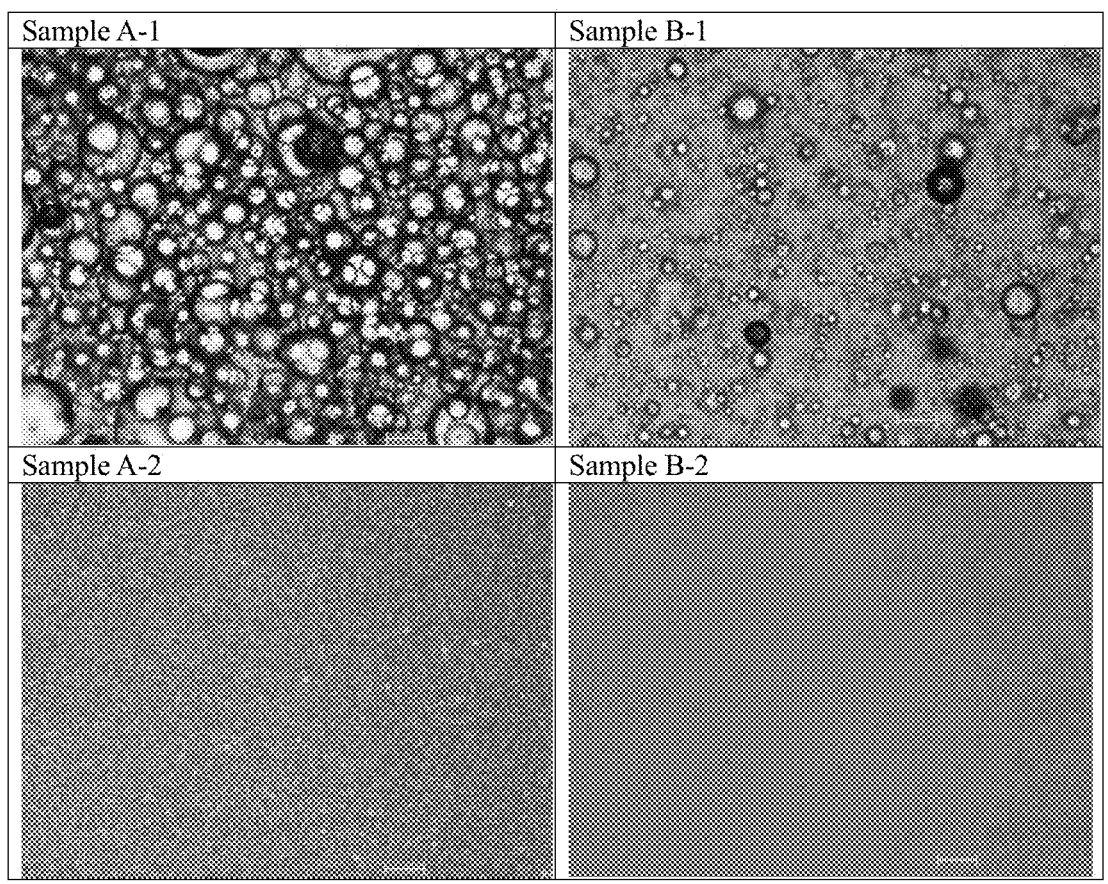

OIL-IN-WATER DISPERSION TYPE OIL-CONTAINING LIQUID FOOD

TECHNICAL FIELD

The present invention relates to an oil-in-water dispersion-type oil-containing liquid food.

BACKGROUND ART

Many liquid foods contain oil and water. Such liquid foods are usually classified into either a food wherein the oil is stably dispersed as oil droplets in water (referred to as an oil-in-water dispersion-type oil-containing liquid food in this description), or a food wherein an oil phase and a water phase are separated from each other (referred to as a non-dispersion-type oil-containing liquid food in this description). Strongly stirring or shaking a mixture of oil and water causes a state wherein oil droplets become dispersed in water. Without an emulsifier, however, the individual oil droplets aggregate in a short period of time. Then, the mixture separates into an oil phase and a water phase. Oil-in-water dispersion-type oil-containing liquid food typically contains a surfactant as an emulsifier. This surfactant adsorbs to an interface caused by homogenizer treatment between the oil droplets and the water to form micelles, whereby the oil droplets are stably dispersed in the water (this oil-in-water dispersion-type oil-containing liquid food is referred to as a surfactant-containing emulsified food in this description). This oil droplet typically has a particle diameter of about 1 to 5 μm. Since visible light is scattered about by this, the opaque appearance which became cloudy is shown. This surfactant-containing emulsified food can be stably stored over a long period of time in a state wherein the dispersion of the oil droplets is maintained, and thus has a convenient advantage such that mixing is not necessary when the food is used. However, because the oil droplets are coated with the micelles of the surfactant in this structure, the micelles of the surfactant are interposed between the tongue and the oil droplets, causes the fault that lack of sharpness in flavor release.

In contrast, in non-dispersion-type oil-containing liquid food wherein the oil phase and the water phase are separated from each other, a consumer of the food can taste, for example, flavor oils, flavorings, or extracts dissolved in the oil phase; or the oil droplets themselves, directly by the tongue; therefore, unlike the surfactant-containing emulsified food, sharp flavor release can be enjoyed. However, non-dispersion-type oil-containing liquid food needs to be separately filled up with the water phase and the oil phase into a container, etc., during production. Here, preparing non-dispersion-type oil-containing liquid food with high viscosity leads to a state wherein the oil droplets are temporarily dispersed in the water. This allows the non-dispersion-type oil-containing liquid food to be filled into a container, etc., in the form of a single liquid. However, in this case, the sharpness of the flavor release is likely to decrease.

It is no exaggeration to say that all oil-in-water dispersion-type oil-containing liquid foods that are currently commercially available are, in fact, surfactant-containing emulsified foods. However, attempts to stably disperse oil in water while reducing or without usage of commonly used surfactants are publicly known. Examples include a food wherein a water phase portion contains xanthan gum, kappa-carrageenan, and galactomannan, and the water phase is in a gel state (see Patent Literature 1); a food produced by adding deacylated gellan gum and xanthan gum to form a gel, and then finely crushing the gel into small pieces (see Patent Literature 2); a food that contains a defibrated material of fermentation-derived cellulose as an emulsification stabilizer (see Patent Literature 3); a food that contains cellulose with a predetermined particle diameter as an emulsifier (see Patent Literature 4 and 5); etc.

In this regard, Patent Literature 6 discloses a dispersion stabilizer using a combination of fermentation-derived cellulose and native gellan gum. However, in Patent Literature 6, the reduction of precipitation of insoluble solids content is intended, and Patent Literature 6 does not disclose any oil-in-water dispersion-type oil-containing liquid food.

CITATION LIST

Patent Literature

Patent Literature 1: JP2008-289388A
Patent Literature 2: JP2005-253425A
Patent Literature 3: JP62-83854A
Patent Literature 4: JP2743442B
Patent Literature 5: JP2734062B
Patent Literature 6: JP3783092B

DISCLOSURE OF THE INVENTION

Problems to be Solved by the Invention

The technique disclosed in Patent Literature 1 is a technique in which, so as to uniformly disperse the oil droplets in the water phase portion, the water phase portion is gelatinized and the gel is shaken to break it down when the food is consumed. Similarly, the technique disclosed in Patent Literature 2 is a technique in which gel is formed by adding deacylated gellan gum and xanthan gum to a solution containing a water phase portion and an oil phase portion, and the gel is finely crushed into small pieces to maintain uniform dispersion of the oil droplets.

Accordingly, the technique for forming a fine gel allows for the production of an oil-in-water dispersion-type oil-containing liquid food with a sharper flavor release than that of surfactant-containing emulsified food. However, these foods have low oil dispersibility. In particular, drawbacks of food with a low water content (a food with a high oil content) include the water phase being easily separated due to extremely low stability of the oil droplet dispersion, etc. In particular, in the case where deacylated gellan gum is used, salt-containing foods have low stability of the oil droplet dispersion. Further, the techniques disclosed in Patent Literature 1 and 2 are subject to temperature restrictions during filling, wherein the food must be filled into the container above the gelation temperature.

Additionally, the techniques disclosed in Patent Literature 1 and 2 cannot maintain the dispersion of the oil droplets between long-term storage, as will be shown by the experimental examples of this description.

The technique disclosed in Patent Literature 3 is a technique that uses the defibrated material of fermentation-derived cellulose as an emulsification stabilizer. Example 10 therein discloses an emulsified food (liquid seasoning) containing fermentation-derived cellulose prepared by a high-pressure homogenizer treatment. Specifically, Example 10 only discloses seasoning containing 0.6% of monoglycerin fatty acid ester as the surfactant. Therefore, Patent Literature 3 does not disclose any specific oil-in-water dispersion-type oil-containing liquid food that substantially does not contain a surfactant, and that also has a sharp flavor release similar to the non-dispersion-type oil-containing liquid food.

The techniques disclosed in Patent Literature 4 and 5 are techniques wherein cellulose with a predetermined particle diameter is used as an emulsifier to achieve higher emulsification stability. However, these techniques use cellulose with a predetermined particle diameter instead of a surfactant. The cellulose still adsorbs to the interface between the oil droplets and the water similarly to a surfactant. Therefore, these techniques cannot provide a sharp flavor release similar to that provided by non-dispersion-type oil-containing liquid food.

In view of the above conventional techniques, an object of the present invention is to provide a food that has a combination of the respective advantages of surfactant-containing emulsified food and non-dispersion-type oil-containing liquid food. Specifically, an object of the present invention is to provide an oil-in-water dispersion-type oil-containing liquid food with stability (the stability of the oil droplet dispersion) comparable to the stability of a surfactant-containing emulsified food, while providing a sharp flavor release unique to the non-dispersion-type oil-containing liquid food. In particular, the present invention aims to provide an oil-in-water dispersion-type oil-containing liquid food that is highly stable, such that the dispersion of oil droplets can be maintained even several months after the formation of the oil droplets.

Solutions to the Problems

As a result of intensive research efforts, the inventors discovered that an oil-in-water dispersion-type oil-containing liquid food including water, oil, a three-dimensional network structure substantially consisting of fine cellulose, and at least one polysaccharide selected from the group consisting of native gellan gum, xanthan gum, iota-carrageenan, and guar gum, wherein the food substantially does not contain a surfactant, and droplets of the oil are stably dispersed in the water can achieve the following effect. That is, the oil-in-water dispersion-type oil-containing liquid food has stability (stability of oil droplet dispersion) comparable to that of surfactant-containing emulsified food while providing a sharp flavor release unique to non-dispersion-type oil-containing liquid food. Following additional research, the present invention has been accomplished.

The superior characteristics of the food of the present invention are presumably because oil droplets are held in huge voids of a three-dimensional network structure substantially consisting of fine cellulose fibers, and because aggregation of the oil droplets is blocked in the oil-in-water dispersion-type oil-containing liquid food of the present invention. However, the present invention is not limited to this mechanism.

Stirring the oil-in-water dispersion-type oil-containing liquid food of the present invention easily causes breakdown of the three-dimensional network structure. Thus, the oil-in-water dispersion-type oil-containing liquid food of the present invention is also considered to have the properties of a liquid, not a gel.

The present invention relates to an oil-in-water dispersion-type oil-containing liquid food, and a method for producing the oil-in-water dispersion-type oil-containing liquid food according to the following.

Item 1.

An oil-in-water dispersion-type oil-containing liquid food including water, oil, a three-dimensional network structure substantially consisting of fine cellulose, and at least one polysaccharide selected from the group consisting of native gellan gum, xanthan gum, iota-carrageenan, and guar gum, wherein the food substantially does not contain a surfactant, and droplets of the oil are stably dispersed in the water.

Item 2.

The oil-in-water dispersion-type oil-containing liquid food according to item 1, wherein the oil-in-water dispersion-type oil-containing liquid food has a viscosity equal to or less than 2000 mPa·s.

Item 3.

The oil-in-water dispersion-type oil-containing liquid food according to item 1 or 2, wherein the oil-in-water dispersion-type oil-containing liquid food is liquid soup or liquid seasoning.

Item 4.

A method for producing the oil-in-water dispersion-type oil-containing liquid food according to item 1, including:

mixing and stirring an oil phase and a water phase that contains a fermentation-derived cellulose complex and at least one polysaccharide selected from the group consisting of native gellan gum, xanthan gum, iota-carrageenan, and guar gum.

Item 5.

A method for producing the oil-in-water dispersion-type oil-containing liquid food according to item 1, including:

adding a fermentation-derived cellulose complex and at least one polysaccharide selected from the group consisting of native gellan gum, xanthan gum, iota-carrageenan, and guar gum to a non-dispersion-type oil-containing liquid food that contains water and oil but that substantially does not contain a surfactant.

Effects of the Invention

The present invention provides a food having stability of the oil droplet dispersion comparable to that of surfactant-containing emulsified food while providing a sharp flavor release unique to non-dispersion-type oil-containing liquid food.

Further, the technique of the present invention does not utilize a gelation technique. Therefore, this technique is not subject to the influence of temperature restrictions during the filling of the oil-in-water dispersion-type oil-containing liquid food into a sachet or a container.

BRIEF DESCRIPTION OF THE DRAWINGS

FIG. 1 shows photographs illustrating respective states of Example 1-1, Comparative Example 1-2, and Comparative Example 1-5 after storage for three months at 20° C. in Experimental Example 1.

FIG. 2 shows photographs illustrating respective states of Example 2-1 after storage for three months at 20° C., and Comparative Example 2-2 and Comparative Example 2-3 immediately after preparation in Experimental Example 2.

FIG. 3 shows photomicrographs illustrating models of an oil-in-water dispersion-type oil-containing liquid food of the present invention, and models of a surfactant-containing emulsified food.

DESCRIPTION OF PREFERRED EMBODIMENTS

In this description, unless otherwise specified, "mass percent" denotes w/w %.

In this description, the term "oil" is broadly interpreted and means a material (that is, a water-insoluble liquid material) that is water-insoluble, has a smaller specific gravity than water, and is in a liquid state at a temperature equal to or higher than room temperature. The term "oil" includes fat.

The oil-in-water dispersion-type oil-containing liquid food of the present invention is characterized by comprising water, oil, a three-dimensional network structure substantially consisting of fine cellulose, and at least one polysaccharide selected from the group consisting of native gellan gum, xanthan gum, iota-carrageenan, and guar gum. This food substantially does not contain a surfactant, and droplets of the oil are stably dispersed in the water.

The water in the oil-in-water dispersion-type oil-containing liquid food of the present invention is a dispersion medium to form the water phase as a continuous layer.

The oil in the oil-in-water dispersion-type oil-containing liquid food of the present invention forms the oil phase as a dispersoid.

The water phase and the oil phase may each contain other components of the oil-in-water dispersion-type oil-containing liquid food.

The oil in the oil-in-water dispersion-type oil-containing liquid food of the present invention is not specifically limited, and any appropriate oil for various foods may be used. Specific examples of the oil include vegetable oil or a fractionated oil thereof, hydrogenated oil, transesterified oil, animal oil, etc. The oils may be used alone, or in a combination of two or more. Examples of the vegetable oil include soybean oil, rapeseed oil, sesame oil, cottonseed oil, corn oil, rice bran oil, sunflower oil, olive oil, safflower oil, palm oil, palm kernel oil, coconut oil, etc.

The oil-in-water dispersion-type oil-containing liquid food of the present invention usually has an oil content of 1 to 80 mass percent, preferably 3 to 70 mass percent, more preferably 10 to 60 mass percent. The oil-in-water dispersion-type oil-containing liquid food of the present invention substantially does not contain a surfactant; therefore, oil droplets are not coated with micelles of the surfactant. Accordingly, a sharp flavor is released.

Typically, in the case where a food substantially does not contain a surfactant, it is difficult to stabilize the oil droplet dispersion for a long period of time, even if the oil content is merely one mass percent. Further, if the oil content is equal to or higher than 10 mass percent, it is extremely difficult to maintain the oil droplet dispersion. However, the present invention enables high stability to be maintained even in the case where the oil content is equal to or higher than 10 mass percent, further equal to or higher than 20 mass percent, thus providing an oil-in-water dispersion-type oil-containing liquid food that has a combination of a sharp flavor release unique to non-dispersion-type oil-containing liquid food and high stability of oil droplet dispersion comparable to that of surfactant-containing emulsified food.

The oil-in-water dispersion-type oil-containing liquid food of the present invention includes a "three-dimensional network structure" substantially consisting of fine cellulose. The fine cellulose constitutes a frame of a three-dimensional network structure. This three-dimensional network structure may contain a component other than the fine cellulose, insofar as the advantageous effects of the present invention are provided. It is preferable that the "fine cellulose" have a very small fiber diameter of about 10 nm to about 1 μm. In the "three-dimensional network structure" included in the oil-in-water dispersion-type oil-containing liquid food of the present invention, a bundle may be formed by a plurality of the separable "fine celluloses" aggregated together. Here, the fiber diameter may be a diameter of this bundle. Examples of the fine cellulose include fermentation-derived cellulose produced by a cellulose-producing bacterium (for example, a bacterium belonging to genus *Acetobacter*, genus *Pseudomonas*, genus *Agrobacterium*, etc.). Here, this fiber diameter is significantly smaller than a fiber diameter of a common plant-derived cellulose fiber, but the fiber length thereof is long. The fine cellulose forms a three-dimensional network structure in the oil-in-water dispersion-type oil-containing liquid food, and is significantly different from microcrystalline cellulose existing as small particles.

In the oil-in-water dispersion-type oil-containing liquid food of the present invention, it is presumed that the three-dimensional network structure is formed by self-organization of the fine cellulose.

The size of the three-dimensional network structure is preferably large from the viewpoint of holding many oil droplets while preventing aggregation of the individual oil droplets.

A 0.1% aqueous solution of the fine cellulose is stirred by a propeller for 10 minutes, and then undergoes high-pressure homogenization treatment once at a pressure of 15 MPa. Subsequently, a measurement is performed using a laser diffraction/scattering particle size distribution analyzer.

As the size of a clump of the three-dimensional network structure, a value of about 100 to 1000 μm is observed in some cases of the measurement. In the present invention, it is preferable that the value measured as the clump of the three-dimensional network structure not have a number average particle diameter equal to or less than 100 μm; more preferably, that the value measured as the clump of the three-dimensional network structure not have a number average particle diameter equal to or less than 200 μm. Actually, in the oil-in-water dispersion-type oil-containing liquid food of the present invention, the three-dimensional network structure is normally presumed not to have a particle form, but it continuously exists throughout the entire oil-in-water dispersion-type oil-containing liquid food.

The three-dimensional network structure has voids with a size corresponding to the size of the oil droplets in the oil-in-water dispersion-type oil-containing liquid food of the present invention. Larger voids enable larger oil droplets to be held. Therefore, as described later, from the viewpoint of presence of oil and flavor release, a larger void is preferably provided. However, the size inherently has a limitation, and an excessively large size does not allow the oil droplet to be held. The size of the void can be presumed from the size of the oil droplet actually held. Generally, the size of a void in a two-dimensional network structure such as a filter is correlated with a mass per unit area of the two-dimensional network structure. Similarly, in the oil-in-water dispersion-type oil-containing liquid food of the present invention, the size of the void is correlated with a mass per unit volume (content) of the fine cellulose (the fermentation-derived cellulose).

In the oil-in-water dispersion-type oil-containing liquid food of the present invention, the content of the fine cellulose (the fermentation-derived cellulose) is generally within the range of 0.002 to 1 mass percent, preferably 0.01 to 0.6 mass percent, more preferably 0.02 to 0.5 mass percent.

The oil-in-water dispersion-type oil-containing liquid food of the present invention is characterized by containing at least one polysaccharide selected from the group consisting of native gellan gum, xanthan gum, iota-carrageenan, and guar gum in addition to the three-dimensional network structure substantially consisting of the fine cellulose.

Native gellan gum is a fermented polysaccharide produced by *Sphingomonas elodea*, and is a straight-chain polymer polysaccharide formed by constituent units of four polysaccharides including 1-3 linked glucose, 1-4 linked glucuronic acid, 1-4 linked glucose, and 1-4 linked rhamnose. To this 1-3 linked glucose, glyceryl group and acetyl group are linked. Per constituent unit of the 1-3 linked glucose, there is one residue each for carboxyl group and glyceryl group, and the number of residues of acetyl group is about ½ on average. The native gellan gum is commercially available as, for example, KELCOGEL (trade name of CP Kelco, Inc.) LT-100, KELCOGEL (trade name of CP Kelco, Inc.) HM, etc. These products can be obtained from San-Ei Gen F.F.I., Inc.

Xanthan gum is a polysaccharide extracellularly produced by *Xanthomonas campestris*. Xanthan gum is dissolved even in cold water, and has a high viscosity at a low concentration compared with other polysaccharides. Thus, xanthan gum is suitable as a thickening agent. Commercially available products of xanthan gum include VIS TOP (trade name) D-3000, manufactured by San-Ei Gen F.F.I., Inc.

Carrageenan is a natural polymer extracted and purified from red algae. Carrageenan usually has a molecular weight of 100,000 to 500,000, and is a polysaccharide that mainly contains galactose and 3,6-anhydrogalactose. A half-ester sulfate group in the molecule is unique to carrageenan, and is not seen in other natural gums and similar substances. Carrageenan is mainly classified into three types: kappa type, iota type, and lambda type, depending on the linkage position of the sulfate group and the presence of anhydrosugar. The present invention is characterized by its usage of iota-type carrageenan A typical commercially available iota-carrageenan preparation is, for example, "Carrageenan CSI-1 (F)" manufactured by San-Ei Gen F.F.I., Inc.

Guar gum is a neutral polysaccharide derived from leguminous plants with α-1,6 linkage of D-galactose as a side chain to the main chain backbone of β-1,4-D-mannan. In the food industry, guar gum is used as a thickening agent in sauces, noodles, ice creams, and similar food. The ratio of mannose and galactose in guar gum is about 2:1. Thus, guar gum has an advantage of high solubility in water. A commercially available guar gum preparation is, for example, "VIS TOP (trade name) D-20", manufactured by San-Ei Gen F.F.I., Inc.

Surprisingly, in the case where deacylated gellan gum is used instead of native gellan gum, as shown in an example described later, the oil droplet dispersion cannot be maintained even one day. Alternatively, in the case where a fine gel utilizing the reactivity of deacylated gellan gum with cation is used, oil flotation, decrease in stability of the oil droplet dispersion in a food containing salt, and similar problems occur, and the objectives of the present invention cannot be achieved. Similarly, the objectives of the present invention also cannot be achieved in the case where kappa-carrageenan is used instead of iota-carrageenan. Accordingly, in the present invention, the type of the polysaccharide used in combination with the three-dimensional network structure formed by the fine cellulose is important.

In particular, native gellan gum, xanthan gum, or a combination of these polysaccharides is preferred as these polysaccharides.

In the oil-in-water dispersion-type oil-containing liquid food of the present invention, the content of at least one polysaccharide selected from the group consisting of native gellan gum, iota-carrageenan, and guar gum is usually within a range of 0.01 to 0.5 mass percent, preferably 0.03 to 0.4 mass percent. The content of xanthan gum is usually within a range of 0.02 to 0.8 mass percent, preferably 0.05 to 0.5 mass percent, more preferably 0.1 to 0.3 mass percent.

The content of at least one polysaccharide selected from the group consisting of native gellan gum, xanthan gum, iota-carrageenan, and guar gum is usually within a range of 1 to 500 mass parts, preferably 1 to 400 mass parts, more preferably 1 to 300 mass parts with respect to 100 mass parts of the fine cellulose.

The oil-in-water dispersion-type oil-containing liquid food of the present invention may use another polysaccharide in combination, insofar as its viscosity does not exceed the range described later.

The oil-in-water dispersion-type oil-containing liquid food of the present invention substantially does not contain a surfactant unlike common oil-in-water dispersion-type oil-containing liquid food; that is, surfactant-containing emulsified food. In the present invention, the meaning of surfactant is the common meaning, i.e., a substance that acts at the interfacial boundary between originally unmixable substances, such as water and oil, to form a uniform state. Examples of the surfactant include organic acid monoglyceride, glycerin fatty acid ester, polyglyceryl fatty acid ester, sorbitan fatty acid ester, sucrose fatty acid ester, polyoxyethylene sorbitan fatty acid ester, and lecithin. In the present invention, the surfactant can be a general-purpose substance for common usage other than a surfactant, insofar as the substance acts as surfactant. For example, gum ghatti, gum arabic, casein sodium, egg yolk, etc., can be used as the surfactant in the present invention.

Here, "substantially does not contain a surfactant" means that the surfactant content is equal to or less than the critical micelle concentration. That is, the oil droplets are not coated with micelles of the surfactant in the oil-in-water dispersion-type oil-containing liquid food of the present invention.

The oil droplets are stably dispersed in the water in the oil-in-water dispersion-type oil-containing liquid food of the present invention.

When the oil-in-water dispersion-type oil-containing liquid food of the present invention is observed through a microscope, oil droplets are observed. In this respect, the oil-in-water dispersion-type oil-containing liquid food of the present invention is the same as the surfactant-containing emulsified food. In addition to detecting the presence of the surfactant (or measuring the amount of the surfactant), these foods can be distinguished by a simple method described as follows.

For example, in the surfactant-containing emulsified food, the size of the oil droplet is very small (usually, about 1 to 5 μm), as described above. Since these fine particles scatter light, the surfactant-containing emulsified food has a milk-like, turbid appearance. In contrast, the oil-in-water dispersion-type oil-containing liquid food of the present invention has the oil droplet larger than the oil droplet of the surfactant-containing emulsified food, thus having low opacity, as described in detail below. The size of the oil droplet can be easily observed through an optical microscope and similar equipment as exemplarily described in FIG. 3. With this method, these foods can be distinguished.

Another example of a simple distinguishing method is a method in which the oil-in-water dispersion-type oil-containing liquid food is diluted in a tenfold amount of water.

For example, in a surfactant-containing emulsified food, oil present in the water phase is stabilized by micelles. Therefore, when the food is diluted in water in an amount such that the resulting concentration will not fall below the critical micelle concentration (for example, a tenfold amount of water), the oil droplets are maintained and the particle diameter of the oil droplet can be measured through, for example, a laser diffraction particle size distribution analyzer.

On the other hand, when the oil-in-water dispersion-type oil-containing liquid food of the present invention is diluted in a tenfold amount of water, the oil droplet dispersion be easily broken down, and the oil floats on the surface. Therefore, the particle diameter of the oil droplet cannot be measured through the laser diffraction particle size distribution analyzer.

Another example of the simple distinguishing method is a method in which the oil-in-water dispersion-type oil-containing liquid food is frozen and thawed. Unlike the surfactant-containing emulsified food, the oil-in-water dispersion-type oil-containing liquid food of the present invention is unstable during a freezing and thawing process; therefore, the occurrence of breakdown of the oil droplet dispersion and separation (water separation) are observed.

The oil-in-water dispersion-type oil-containing liquid food of the present invention may contain a component other than the above-described components, depending on the type of food. This component may be dissolved or dispersed in the water phase or the oil phase; present at the interface between the water phase and the oil phase; or precipitated or deposited.

The oil-in-water dispersion-type oil-containing liquid food of the present invention is not specifically limited. For example, the oil-in-water dispersion-type oil-containing liquid food can be liquid soup such as ramen soup (for example, pork bone), liquid seasoning (typically, seasoning where an aqueous medium (such as vinegar, soy sauce, fruit juice, liquid sugar, and fresh water) and an oil medium (such as oil) are combined with, for example, an aqueous raw material and/or an oil raw material), curry, chocolate, and flour paste, etc. For example, a surfactant is usually used in high oil-content food such as instant curry (retort-packed), etc. The oil droplets are coated with micelles of the surfactant. Thus, the flavor release is not sharp. Even in this target food, the present invention forms and maintains an oil droplet dispersion state, providing a food that has a combination of property of sharp flavor release of the non-dispersion-type oil-containing liquid food, and stability of oil droplet dispersion of the surfactant-containing emulsified food. The present invention is particularly preferably applied to liquid soup or liquid seasoning.

The oil-in-water dispersion-type oil-containing liquid food of the present invention may have a state where the oil droplet dispersion is easily broken down when being diluted in water (for example, hot water) in use insofar as the state of oil droplet dispersion is held during storage.

As one example, in the case where the oil-in-water dispersion-type oil-containing liquid food of the present invention is ramen soup, uniform filling is possible by maintaining the oil droplet dispersion during filling into a sachet or during storage. On the other hand, when this food is diluted in cool water or hot water for eating, the state of the oil droplet dispersion may break down, and the oil may separate. From the viewpoint of good flavor release, this is rather preferable.

As another example, in the case where the target food is liquid seasoning, since liquid seasoning is not usually diluted in cool water or hot water, the oil droplet dispersion is maintained from preparation to storage, and before eating, but the state of the oil droplet dispersion may break down during eating.

Liquid soup and liquid seasoning, in particular, are foods that contain a high salinity when compared with other foods. Therefore it has been considerably difficult to maintain oil droplet dispersion in these foods over a long period of time using conventional techniques, such as the technique with the fine gel. In this respect, the oil-in-water dispersion-type oil-containing liquid food of the present invention can maintain oil droplet dispersion even in the case where the salinity is equal to or higher than 5 mass percent, and further equal to or higher than 10 mass percent. Thus, these salinities are available. Here, salinity means concentration of sodium chloride.

Additionally, the oil-in-water dispersion-type oil-containing liquid food of the present invention can maintain oil droplet dispersion over a long period of time without a decrease in stability, even in the case where the pH indicates acidity (for example, the pH is equal to or less than four). Accordingly, a pH at this level is available.

The oil-in-water dispersion-type oil-containing liquid food of the present invention is preferably adjusted to a low viscosity. The low viscosity is 2000 mPa·s or less, preferably 1500 mPa·s or less, or more preferably 1000 mPa·s or less.

This viscosity is obtained by measuring the target food with a BL rotational viscometer under a condition of 20° C. at a rotation speed of 60 rpm for one minute. Hereinafter, "viscosity" in this description denotes a value measured by this method.

In this measurement, the following rotors are used depending on the viscosity of the target food.

Rotor 1 1 to 100 mPa·s
Rotor 2 101 to 500 mP·s
Rotor 3 501 to 2000 mPa·s
Rotor 4 2001 to 10000 mPa·s Generally, in a food containing water and oil, a larger viscosity more easily prevents separation into two layers of the oil phase and the water phase. However, a viscosity higher than 2000 mPa·s is prone to reduction of sharp flavor release.

In contrast, the oil-in-water dispersion-type oil-containing liquid food of the present invention shows very good stability of oil droplet dispersion, even at a low viscosity wherein the viscosity at 20° C. is equal to or less than 2000 mPa·s.

The oil-in-water dispersion-type oil-containing liquid food of the present invention contains the oil droplet having a larger particle diameter than the oil droplet of a typical surfactant-containing emulsified food. This is consistent with the earlier-described presumptive mechanism of stabilization of the oil droplets. Generally, in the surfactant-containing emulsified food, the oil droplet dispersion is easily maintained by ensuring a small particle diameter of the oil droplet. A larger particle diameter of the oil droplet in the water phase causes more aggregation of the oil droplets, and creaming (which is flotation of the oil droplets on the surface). As a result, this easily causes two-layer separation into the oil phase and the water phase. Therefore, as described above, the particle diameter of the oil droplet is usually about 1 to 5 μm (for example, a particle diameter of an oil droplet of typical mayonnaise is about 2 to 3 μm).

Because of this small particle diameter, the surfactant-containing emulsified food has a creamy texture. However, one of the factors of palatability that a human tongue can sense is the presence of oil (fat feel). The fat feel of the surfactant-containing emulsified food is insufficient.

In contrast, as described in the following Examples, the oil droplet in the oil-in-water dispersion-type oil-containing liquid food of the present invention has a considerably larger particle diameter compared with the surfactant-containing emulsified food. Specifically, the average particle diameter can be equal to or greater than 5 μm. Additionally, the oil-in-water dispersion-type oil-containing liquid food of the present invention can hold an oil droplet having a particle diameter exceeding 100 μm.

In the oil-in-water dispersion-type oil-containing liquid food of the present invention, the average value of the particle diameter of the oil droplet is usually 5 to 100 μm, and preferably 10 to 80 μm. The particle diameter of the oil droplet in the oil-in-water dispersion-type oil-containing liquid food is measured through an optical microscope. In this case, respective particle diameters of 100 randomly selected oil droplets among the oil droplet particles observed through an optical microscope are measured. Subsequently, the average value of these particle diameters is calculated. In the oil-in-water dispersion-type oil-containing liquid food of the present invention, there are 10 or more oil droplets each having a particle diameter equal to or greater than 5 μm in the case where a randomly selected region at an actual scale of a size of 700 μm×600 μm is observed through an optical microscope.

Accordingly, the oil-in-water dispersion-type oil-containing liquid food of the present invention contains the oil droplet with a large particle diameter. Thus, the presence of oil (fat feel) can be easily sensed by the tongue, and the flavor release is excellent.

As described above, the present invention is an invention made based on the finding that, by using, as described above, a combination of the three-dimensional network structure substantially consisting of the fine cellulose, and at least one polysaccharide selected from the group consisting of native gellan gum, xanthan gum, iota-carrageenan, and guar gum, an oil-in-water dispersion-type oil-containing liquid food with surprisingly excellent long-term stability while containing oil droplets with a large particle diameter, which is usually prone to two-layer separation, can be provided.

The oil-in-water dispersion-type oil-containing liquid food of the present invention provides an extremely excellent effect to stably maintain the oil droplet dispersion during a long term of at least one month or more, further six months or more, and further 10 months or more. In the present invention, stable oil droplet dispersion (state) means that an oil droplet is present in the water phase and separation into two layers does not completely occur. For example, this means that separation into two layers does not occur in a state where water phase:oil phase is 1:1 in the case where a mixing ratio of water phase:oil phase is 1:1. More preferably, stable oil droplet dispersion means that separation of the water layer or the oil layer is not observed.

Production Method

The oil-in-water dispersion-type oil-containing liquid food of the present invention can be prepared by mixing (shaking by hand or mechanical stirring (by a homomixer, a homogenizer process, etc.)) of the oil phase and the water phase containing a fermentation-derived cellulose complex and at least one polysaccharide selected from the group consisting of native gellan gum, xanthan gum, iota-carrageenan, and guar gum, under relatively calm dynamic conditions, to an extent that does not cause excessive shortening of the fiber length.

The order in which these substances are mixed is not limited. Therefore, the oil-in-water dispersion-type oil-containing liquid food of the present invention may also be prepared by adding the fermentation-derived cellulose complex and at least one polysaccharide selected from the group consisting of native gellan gum, xanthan gum, iota-carrageenan, and guar gum to a non-dispersion-type oil-containing liquid food that contains water and oil, but that substantially does not contain a surfactant.

Here, fermentation-derived cellulose in the fermentation-derived cellulose complex expands in water to form the three-dimensional network structure.

The fermentation-derived cellulose complex used in the present invention is a complex of the fermentation-derived cellulose and another polymer. This complex is substantially consisting of fermentation-derived cellulose and another polymer; it is preferable to have the other polymer adhered to a surface of a fine fermentation-derived cellulose fiber. The "other polymer" used in this complexing is not specifically limited insofar as the other polymer is applicable to foods. The other polymer may be, for example, xanthan gum, galactomannan, carboxymethyl cellulose (CMC) or a salt thereof, tamarind seed gum, pectin, gum arabic, gum tragacanth, karaya gum, gum ghatti, carrageenan, agar, alginic acid and alginate, gellan gum, curdlan, pullulan, a soybean polysaccharide, psyllium seed gum, glucomannan, chitin, chitosan, etc.

In particular, xanthan gum, galactomannan, and carboxymethyl cellulose (CMC) or a salt thereof are preferred. The galactomannan is preferably guar gum. A preferable example of CMC or a salt thereof is CMC sodium salt. In the present invention, in particular, a fermentation-derived cellulose complex formed by complexing with guar gum and either CMC or a salt thereof and a fermentation-derived cellulose complex formed by complexing with xanthan gum and either CMC or a salt thereof are preferably used.

The weight ratio of the fermentation-derived cellulose in the fermentation-derived cellulose complex used in the present invention and the other polymer is preferably within a range of 1:1 to 10:1, and more preferably 1:1 to 5:1.

The complexing of fermentation-derived cellulose can be achieved, for example, using: a method of mixing liquid containing the fermentation-derived cellulose (a fermentation-derived cellulose-producing bacterium, which may be contained in this liquid, may be dissolved by alkaline treatment, etc., as desired) and a solution of the other polymer, and then obtaining a fermentation-derived cellulose complex by alcohol precipitation using such as isopropyl alcohol or by spray-drying, etc.; a method of immersing a gel of the fermentation-derived cellulose in a solution of the polymer; or a method disclosed in JP9-121787A (specifically, a method of adding other polymer(s) into a culture medium, which is for culturing the fermentation-derived cellulose-producing microorganism). As needed, a dry powder can be obtained by drying the fermentation-derived cellulose complex.

In the production of the oil-in-water dispersion-type oil-containing liquid food of the present invention, the use of such a dry powder is convenient.

Such a dry powder of the fermentation-derived cellulose complex is commercially available. Examples thereof include "SAN ARTIST (trade name) PG" (preparation of a complex of guar gum, CMC sodium salt, and fermentation-derived cellulose) and "SAN ARTIST (trade name) PX" (preparation of a complex of xanthan gum, CMC sodium salt, and fermentation-derived cellulose), both manufactured by San-Ei Gen F.F.I., Inc.

The oil-in-water dispersion-type oil-containing liquid food of the present invention can be produced by using such a fermentation-derived cellulose complex. When simple fermentation-derived cellulose is used instead of the fermentation-derived cellulose complex, the three-dimensional network structure cannot be formed by a common method. It is considered that this is because the three-dimensional network structure is formed by the self-organization property of the fine cellulose (the fermentation-derived cellulose). In the case of simple fermentation-derived cellulose, it is presumed that its self-organization property hinders its expansion in water. That is, "the other polymer" described above of the fermentation-derived cellulose complex is considered to help the fine cellulose (the fermentation-derived cellulose) expand in water so as to form the three-dimensional network structure.

A method for preparing the water phase is not specifically limited insofar as the water phase can contain a fermentation-derived cellulose complex and at least one polysaccharide selected from the group consisting of native gellan gum, xanthan gum, iota-carrageenan, and guar gum. The method preferably includes: adding dry powder(s) of the fermentation-derived cellulose complex to the water phase; performing homogenizer treatment (for example, equal to or greater than 150 kgf/cm$^2$); and subsequently adding at least one polysaccharide selected from the group consisting of native gellan gum, xanthan gum, iota-carrageenan, and guar gum to the water phase, and dissolving the solution by heating.

The amount of each component can be easily determined depending on the content in a target oil-in-water dispersion-type oil-containing liquid food.

The oil-in-water dispersion-type oil-containing liquid food of the present invention has an advantage in that the temperature (the filling temperature) during filling of the food into a sachet or a container is not limited, unlike the conventional oil-in-water dispersion-type oil-containing liquid food obtained by gelatinizing the water phase portion. This is a significant advantage in the manufacturing process.

The oil-in-water dispersion-type oil-containing liquid food thus obtained is extremely useful as it has the advantages of the surfactant-containing emulsified food and the non-dispersion-type oil-containing liquid food. Specifically, the oil-in-water dispersion-type oil-containing liquid food maintains stability (stability of the oil droplet dispersion) comparable to that of the surfactant-containing emulsified food; in particular, it maintains the oil droplet dispersion even after several months after the formation of the oil droplets, while providing a sharp flavor release unique to the non-dispersion-type oil-containing liquid food.

Specifically, the oil-in-water dispersion-type oil-containing liquid food of the present invention has the following advantages. For example, in the case of liquid soup and liquid seasoning for professional use that have two separated layers, it is necessary that the water phase and the oil phase be mixed (shaken) when used or filled (filled as a single liquid) into a sachet (for example, sachet of liquid soup with a commercially available instant noodle). Since these foods are used in large volumes, it is extremely troublesome to mix (shake) these foods. In contrast, the oil-in-water dispersion-type oil-containing liquid food of the present invention does not require such mixing (shaking). Similarly, the liquid soup and the liquid seasoning separated into two layers must be mixed (shaken) before eating. In contrast, the oil-in-water dispersion-type oil-containing liquid food of the present invention can be consumed without shaking, or with only slight shaking.

Accordingly, the oil-in-water dispersion-type oil-containing liquid food of the present invention has a combination of the convenience of the surfactant-containing emulsified food, and the sharp flavor release property of the non-dispersion-type oil-containing liquid food.

EXAMPLES

Hereinafter, the present invention is explained in further detail with reference to Examples. However, these examples do not limit the present invention. In the Examples, "pts." and "%" respectively mean "mass parts" and "mass percent (w/w)". In the sentences, the mark "1" means that San-Ei Gen F.F.I., Inc. is the manufacturer, and the mark "2" designates a trademark of San-Ei Gen F.F.I., Inc.

Experimental Example 1

Preparation of Oil-in-Water Dispersion-Type Oil-Containing Liquid Food (Model System)

A model oil-in-water dispersion-type oil-containing liquid food was prepared according to the formulation in Table 1. Specifically, various polysaccharides and surfactant as necessary (Comparative Example 1-2 and Comparative Example 1-5) were added to water at 80° C. The mixture was stirred for 10 minutes at 1000 rpm with a four-bladed propeller. After soy sauce and flavor oil (chicken fat) were added, the mixture was stirred for five more minutes. Subsequently, the mixture was filled into a container to prepare an oil-in-water dispersion-type oil-containing liquid food (Examples 1-1 to 1-2 and Comparative Examples 1-1 to 1-5).

After the obtained oil-in-water dispersion-type oil-containing liquid food was stored for three months at 20° C., the separation state of the oil was observed according to the evaluation criteria in Table 3. Additionally, after the oil-in-water dispersion-type oil-containing liquid food was diluted in a tenfold amount of boiling water, the flavor was evaluated. The results are shown in Table 2.

TABLE 1

| Formulation (pts.) | | Example | | Comparative Example | | | | |
|---|---|---|---|---|---|---|---|---|
| | | 1-1 | 1-2 | 1-1 | 1-2 | 1-3 | 1-4 | 1-5 |
| Soy sauce | | 30 | 30 | 30 | 30 | 30 | 30 | 30 |
| Flavor oil | | 20 | 20 | 20 | 20 | 20 | 20 | 20 |
| Polysaccharide | Fermentation-derived cellulose complex preparation [Note 1] | 1.5 | 1.5 | 1.5 | 1.5 | — | — | — |
| | Guar gum | 0.2 | — | — | 0.2 | 0.1 | — | — |
| | Native gellan gum | — | 0.03 | — | — | — | — | — |
| | Deacetylated gellan gum | — | — | — | — | — | 0.2 | — |
| | Kappa-carrageenan | — | — | — | — | 0.25 | — | — |
| | Xanthan gum | — | — | — | — | — | 0.2 | — |
| | Sucrose fatty acid ester (surfactant) | — | — | — | 0.6 | — | — | 0.05 |
| Total with water | | 100 | 100 | 100 | 100 | 100 | 100 | 100 |
| Oil content (%) | | 20 | 20 | 20 | 20 | 20 | 20 | 20 |

[Note 1] "SAN ARTIST*²PX*¹" is used as preparation of the fermentation-derived cellulose complex (powdered preparation containing 33.3% of a complex of the fermentation-derived cellulose, xanthan gum, and CMC (the content of the fermentation-derived cellulose is 20% in the powdered preparation))

TABLE 2

| | Oil droplet dispersion after tenfold dilution | Stability (Separation of oil) | Flavor release property | Remarks | Viscosity (mPa · s) |
|---|---|---|---|---|---|
| Example 1-1 | Poor | Excellent (FIG. 1) | Excellent | Flavor release was sharp. Oil was not separated after storage for three months. | 359 |
| Example 1-2 | Poor | Excellent | Excellent | Flavor release was sharp. Oil was not separated after storage for three months. | 320 |
| Comparative Example 1-1 | Poor | Fair | Excellent | Flavor release was excellent, but oil was nearly separated after storage for one month. | 298 |
| Comparative Example 1-2 | Good | Fair (FIG. 1) (0.8 cm (10%) of separation in upper portion) | Poor | Oil was partially separated in the upper layer. Flavor release did not have sharpness. The flavor as a whole became mild. | 780 |
| Comparative Example 1-3 | Poor | Poor | Good | Flavor release was excellent compared with surfactant-containing emulsified food, but oil was separated immediately after preparation. | 83 |
| Comparative Example 1-4 | Poor | Poor | Good | Flavor release was excellent compared with surfactant-containing emulsified food, but oil was separated immediately after preparation. | 125 |
| Comparative Example 1-5 | Oil droplets are partially dispersed | Poor (FIG. 1) | Fair | Both stability and flavor release were poor. The water phase and oil phase were clearly separated. | 20 |

TABLE 3

| Evaluation items | Evaluation method |
|---|---|
| Oil droplet dispersion after tenfold dilution | The evaluation criterion was for whether or not the particle diameter of an oil droplet can be measured by laser diffraction particle size distribution analyzer even after tenfold dilution with water. In the case where measurement is impossible, it is presumed that oil droplet dispersion is not caused by a surfactant. "Poor" indicates that measurement was impossible. "Good" indicates that measurement was possible. |
| Stability (Separation of oil) | Separation state of oil after storage was evaluated. Evaluation results were provided as Excellent, Good, Fair, and Poor in this order from the state of highest stability. |
| Flavor release property | After tenfold dilution with boiling water, flavor was evaluated. Evaluation results were provided at four levels of Excellent, Good, Fair, and Poor in this order from a state of excellent flavor release. |
| Viscosity (mPa·s) | Value measured under condition of 20° C. at 60 rpm for one minute. |

The oil-in-water dispersion-type oil-containing liquid food of the present invention (Examples 1-1 and 1-2: a combination of the fermentation-derived cellulose complex and either guar gum or the native gellan gum) was a food that had a combination of respective advantages of the non-dispersion-type oil-containing liquid food and the surfactant-containing emulsified food to ensure stability comparable to that of the surfactant-containing emulsified food even after being stored for three months at 20° C. while providing a sharp flavor release. On the other hand, the stability of the oil droplet was insufficient in Comparative Example 1-1 using the fermentation-derived cellulose complex alone. In the food of Comparative Example 1-2 wherein a combination of the fermentation-derived cellulose complex and guar gum was used and the surfactant was further used, the oil droplet was formed, but the flavor release did not have sharpness. Accordingly, the flavor as a whole became overly mild. Furthermore, despite the fact that the food was a surfactant-containing emulsified food, the oil was partially separated in the upper layer, and the stability was insufficient. In Comparative Examples 1-3 and 1-4 as the non-dispersion-type oil-containing liquid foods, the oil was separated immediately after preparation although the flavor release was improved compared with the oil-in-water dispersion-type oil-containing liquid food. In Comparative Example 1-5 using sucrose fatty acid ester as the surfactant, the food became partially cloudy, and a portion of the oil was separated. When the oil-in-water dispersion-type oil-containing liquid foods in Examples 1-1 and 1-2 were diluted in a tenfold amount of water, the oil droplet dispersion was easily broken down, and the oil floated on the surface. Therefore, the particle diameter could not be measured, even using a laser diffraction particle size distribution analyzer. Additionally, the oil droplet dispersion was easily broken down by freezing and thawing, and separated into the oil phase and the water phase.

Experimental Example 2

Preparation of Oil-in-Water Dispersion-Type Oil-Containing Liquid Food (Model System)

A model oil-in-water dispersion-type oil-containing liquid food was prepared according to the formulation in Table 4. Specifically, various polysaccharides and surfactant as necessary were added to water at 80° C. The mixture was stirred for 10 minutes at 6000 rpm with a four-bladed propeller. After soy sauce and flavor oil (chicken fat) were added, the mixture was stirred for five more minutes. Subsequently, the mixture was filled into a container to prepare an oil-in-water dispersion-type oil-containing liquid food (Examples 2-1 to 2-3 and Comparative Examples 2-1 to 2-4).

After the obtained oil-in-water dispersion-type oil-containing liquid food was stored for three months at 20° C., the separation state of the oil was observed according to the evaluation criteria in Table 3. Additionally, after the oil-in-water dispersion-type oil-containing liquid food was diluted in a tenfold amount of boiling water, the flavor was evaluated. The results are shown in Table 5.

TABLE 4

| Formulation (pts.) | | Example 2-1 | Example 2-2 | Example 2-3 | Comparative Example 2-1 | Comparative Example 2-2 | Comparative Example 2-3 | Comparative Example 2-4 |
|---|---|---|---|---|---|---|---|---|
| Soy sauce | | 10 | 10 | 10 | 10 | 10 | 10 | 10 |
| Flavor oil | | 40 | 40 | 40 | 40 | 40 | 40 | 40 |
| Polysaccharide | Fermentation-derived cellulose complex preparation [Note 2] | 1.6 | 1.6 | 1.6 | 1.6 | 1.6 | — | — |
| | Xanthan gum | 0.5 | 0.25 | 0.1 | — | 0.1 | 0.1 | 0.3 |
| | Tara gum | — | — | — | — | — | 0.008 | — |
| | Deacetylated gellan gum | — | — | — | — | — | — | 0.3 |
| | Kappa-carrageenan | — | — | — | — | — | 0.2 | — |
| Sucrose fatty acid ester (Surfactant) | | — | — | — | — | 0.6 | — | — |
| Total with water | | 100 | 100 | 100 | 100 | 100 | 100 | 100 |
| Oil content (%) | | 40 | 40 | 40 | 40 | 40 | 40 | 40 |

[Note 2] "SAN ARTIST*²PG *¹" is used as preparation of the fermentation-derived cellulose complex (preparation containing 33.4% of a complex of the fermentation-derived cellulose, guar gum, and CMC (the content of the fermentation-derived cellulose is 20% in the powdered preparation))

TABLE 5

| | Oil droplet dispersion after tenfold dilution | Stability (Separation of oil) | Flavor release property | Remarks | Viscosity (mPa·s) |
|---|---|---|---|---|---|
| Example 2-1 | Poor | Excellent (FIG. 2) | Good | Flavor release was sharp. Oil was not separated after storage for three months. | 1959 |
| Example 2-2 | Poor | Excellent | Excellent | Flavor release was sharper compared with Example 2-1, and flavor release was excellent. Oil was not separated after storage for three months. | 980 |
| Example 2-3 | Poor | Excellent | Excellent | Flavor release was extremely sharp, and flavor release as a whole was extremely excellent. Oil was not separated after storage for three months. | 515 |
| Comparative Example 2-1 | Poor | Fair (1 cm (13%) of separation in upper portion) | Excellent | Flavor release was sharp, but oil phase occurred in upper portion after storage for one month. | 212 |
| Comparative Example 2-2 | Good | Fair (FIG. 2) | Poor | Flavor release did not have sharpness. Taste of surfactant was sensed. Oil was partially separated in upper layer. | 890 |
| Comparative Example 2-3 | Poor | Poor (FIG. 2) | Good | Flavor release was good compared with Comparative Example 2-2 (containing surfactant), but oil was separated immediately after preparation. | 420 |

TABLE 5-continued

| | Oil droplet dispersion after tenfold dilution | Stability (Separation of oil) | Flavor release property | Remarks | Viscosity (mPa · s) |
|---|---|---|---|---|---|
| Comparative Example 2-4 | Poor | Poor | Good | Flavor release was good compared with Comparative Example 2-2 (containing surfactant), but oil was separated immediately after preparation. | 580 |

Each of the oil-in-water dispersion-type oil-containing liquid foods in Examples 2-1 to 2-3 using a combination of the fermentation-derived cellulose complex and xanthan gum was a food that had a combination of the respective advantages of the non-dispersion-type oil-containing liquid food and the surfactant-containing emulsified food to ensure stability comparable to that of the surfactant-containing emulsified food even after being stored for three months at 20° C., while providing a sharp flavor release.

On the other hand, the stability of the oil droplet was insufficient in Comparative Example 2-1 using the fermentation-derived cellulose complex alone. In the food of Comparative Example 2-2 wherein a combination of the fermentation-derived cellulose complex and xanthan gum was used and the surfactant was further used, the oil droplet was formed but the flavor release did not have sharpness. Accordingly, the flavor as a whole became overly mild. Furthermore, despite the fact that the food was a surfactant-containing emulsified food, the oil was partially separated in the upper layer, and the stability was insufficient. In Comparative Examples 2-3 and 2-4 as the non-dispersion-type oil-containing liquid foods, the oil was separated immediately after preparation although the flavor release was improved compared with the surfactant-containing emulsified food. Therefore, an intended oil-in-water dispersion-type oil-containing liquid food could not be prepared.

Experimental Example 3

Preparation of Oil-in-Water Dispersion-Type Oil-Containing Liquid Food (Condensed Pork Bone Ramen Soup)

An oil-in-water dispersion-type oil-containing liquid food (pork bone ramen soup) was prepared according to the formulation in Table 6. Specifically, substances other than oil were added to water at 80° C. The mixture was stirred for 10 minutes at 1000 rpm with a four-bladed propeller. After an oil was added, the mixture was stirred for five more minutes. Subsequently, the mixture was sterilized by heat at 80° C. for one hour, and filled into a sachet to prepare the oil-in-water dispersion-type oil-containing liquid food (pork bone ramen soup).

After the obtained oil-in-water dispersion-type oil-containing liquid food was stored for one month at 20° C., the separation state of the oil was observed. The flavor was also evaluated according to the evaluation criteria in Table 3 after the oil-in-water dispersion-type oil-containing liquid food was diluted in a tenfold amount of boiling water. The results are shown in Table 7.

TABLE 6

| Formulation (pts.) | | Example 3-1 | Comparative Example 3-1 | Comparative Example 3-2 |
|---|---|---|---|---|
| Oil | Pork oil | 22 | 22 | 22 |
| | Chicken oil | 8 | 8 | 8 |
| Sugar | | 8 | 8 | 8 |
| Salt | | 5.5 | 5.5 | 5.5 |
| Pork extract | | 11 | 11 | 11 |
| Onion extract | | 3 | 3 | 3 |
| Onion powder | | 1.5 | 1.5 | 1.5 |
| Skimmed milk | | 1 | 1 | 1 |
| L-monosodium glutamate | | 6.5 | 6.5 | 6.5 |
| Seasoning (SAN LIKE*2 Pork 5801P*1) | | 3 | 3 | 3 |
| Seasoning (SAN LIKE*2 Pork extract*1) | | 1 | 1 | 1 |
| Polysaccharide | Fermentation-derived cellulose complex preparation[Note 1] | 1.0 | 1.0 | — |
| | Iota-carrageenan[Note 3] | 0.3 | 0.3 | — |
| | Xanthan gum | — | — | 0.3 |
| | Deacetylated gellan gum | — | — | 0.2 |
| Monoglycerin fatty acid ester (surfactant) | | — | 0.6 | — |
| Total with water | | 100 | 100 | 100 |
| Oil content (%) | | 30 | 30 | 30 |
| Salinity (%) | | 5.5 | 5.5 | 5.5 |

[Note 3] Carrageenan CSI-1 (F) is used

TABLE 7

| | Oil droplet dispersion after tenfold dilution | Stability 80° C. for one hour | Stability 20° C. for one month | Flavor release property | Remarks | Viscosity (mPa · s) |
|---|---|---|---|---|---|---|
| Example 3-1 | Poor | Excellent | Excellent | Excellent | Oil was not separated during heating or after storage for thirty days. Flavor release was sharp and excellent. | 680 |

TABLE 7-continued

| | Oil droplet dispersion after tenfold dilution | Stability 80° C. for one hour | Stability 20° C. for one month | Flavor release property | Remarks | Viscosity (mPa · s) |
|---|---|---|---|---|---|---|
| Comparative Example 3-1 | Good | Excellent | Excellent | Poor | Flavor did not have sharpness, and taste was mellow (flavor as a whole was mild). Taste of surfactant was sensed. | 800 |
| Comparative Example 3-2 | Poor | Poor | Poor | Good | Oil was separated during heating and during storage. In a short period of time, oil was separated. | 835 |

The oil-in-water dispersion-type oil-containing liquid food (pork bone ramen soup) in Example 3-1 using a combination of the fermentation-derived cellulose complex and iota-carrageenan had a sharp and good flavor release without separation of the oil, even after being sterilized by heat and stored for one month at 20° C. On the other hand, even in the case where the combination of the fermentation-derived cellulose complex and iota-carrageenan was used, the oil-in-water dispersion-type oil-containing liquid food in Comparative Example 3-1 containing the surfactant did not have sharpness of flavor. Additionally, in Comparative Example 3-2 using a combination of deacylated gellan gum and xanthan gum, the oil was separated during heat sterilization under a condition of 80° C.

Experimental Example 4

Preparation of Oil-in-Water Dispersion-Type Oil-Containing Liquid Food (Liquid Seasoning)

An oil-in-water dispersion-type oil-containing liquid food (liquid seasoning (seasoning for fried rice)) was prepared according to the formulation in Table 8. Specifically, respective substances were added to water at 80° C. The mixture was stirred for 10 minutes at 1000 rpm with a four-bladed propeller. After the mixture was filled into a container, the mixture was retort-sterilized at 121° C. for 20 minutes. After the obtained oil-in-water dispersion-type oil-containing liquid food was stored for six months at 20° C., the separation state of the oil, the flavor release property, and viscosity were evaluated according to the evaluation criteria in Table 3. 30 g of the oil-in-water dispersion-type oil-containing liquid food was added to 250 g of rice, and the mixture was fried. Table 9 shows the savoriness of the resulting cooked fried rice.

TABLE 8

| Formulation (pts.) | Example 4-1 | Comparative Example 4-1 |
|---|---|---|
| Ketchup | 30 | 30 |
| Sugar | 15 | 15 |
| Salt | 10 | 10 |
| Corn oil | 10 | 10 |
| Tomato paste | 5 | 5 |
| Tomato concentrate (Brix 60°) | 1 | 1 |
| Seasoning (SAN LIKE*[2] sautéed onion 2011E*[1]) | 3 | 3 |
| Seasoning (SAN LIKE*[2] garlic 6332E*[1]) | 1.5 | 1.5 |
| Seasoning (SAN LIKE*[2] amino-based UR (N)*[1]) | 1 | 1 |
| Colorant (paprika oleoresin 400) | 0.1 | 0.1 |
| Fermentation-derived cellulose complex preparation [Note 1] (polysaccharide) | 1.5 | 1.5 |
| Native gellan gum (polysaccharide) | 0.05 | 0.05 |
| Monoglycerin fatty acid ester (surfactant) | — | 0.6 |
| Total with water | 100 | 100 |
| Oil content (%) | 10 | 10 |
| Salinity (%) | 15 | 15 |

TABLE 9

| | Liquid seasoning | | | | | |
|---|---|---|---|---|---|---|
| | Oil droplet dispersion after tenfold dilution | Stability | Savoriness | Viscosity (mPa · s) | Savoriness of fried rice | Remarks |
| Example 4-1 | Poor | Excellent | Excellent | 860 | Excellent | Oil was not separated after storage for six months at 20° C. Flavor of seasoning was sharp and excellent. |

TABLE 9-continued

| | Liquid seasoning | | | | | |
|---|---|---|---|---|---|---|
| | Oil droplet dispersion after tenfold dilution | Stability | Savoriness | Viscosity (mPa·s) | Savoriness of fried rice | Remarks |
| Comparative Example 4-1 | Good | Excellent | Poor | 1030 | Poor | Savoriness of fried rice was excellent. Oil was not separated after storage, but seasoning and fried rice did not have sharpness of flavor. Taste of surfactant was sensed. |

The oil-in-water dispersion-type oil-containing liquid food (the seasoning for fried rice) in Example 4-1 using a combination of the fermentation-derived cellulose complex and native gellan gum had a sharp and good flavor release without separation of the oil even after being stored for six months at 20° C. Additionally, good release of savoriness was provided with the fried rice. On the other hand, Comparative Example 4-1 containing the surfactant in addition to the fermentation-derived cellulose complex and native gellan gum did not have separation of the oil after storage, but had insufficient flavor release and tasted of the surfactant. Additionally, bad release of savoriness was provided with the fried rice.

Experimental Example 5

Preparation of Oil-in-Water Dispersion-Type Oil-Containing Liquid Food (Liquid Seasoning)

An oil-in-water dispersion-type oil-containing liquid food (liquid seasoning (a pasta sauce)) was prepared according to the formulation in Table 10. Specifically, respective substances as seasoning liquid were added to water at 80° C. The mixture was stirred for 10 minutes at 1000 rpm with a four-bladed propeller. After a seasoning oil was prepared, the seasoning liquid and the seasoning oil were mixed together at a seasoning liquid:seasoning oil mixing ratio of 5:2. Subsequently, the mixture was filled into a container, and retort-sterilized at 121° C. for 20 minutes. After the obtained oil-in-water dispersion-type oil-containing liquid food was stored for five months at 20° C., the separation state of the oil, the flavor release property, and the viscosity were evaluated according to the evaluation criteria in Table 3. Additionally, 200 g of boiled pasta and 7 g of the oil-in-water dispersion-type oil-containing liquid food were mixed together. The results regarding the savoriness of the cooked pasta are shown in Table 11.

TABLE 10

| | Formulation (pts.) | Example 5-1 | Comparative Example 5-1 |
|---|---|---|---|
| Seasoning liquid | Salt | 17.0 | 17.0 |
| | Transparent lemon juice | 10.0 | 10.0 |
| | White wine extract (concentrated tenfold) | 3.0 | 3.0 |
| | White pepper | 2.0 | 2.0 |
| | Whole basil | 1.5 | 1.5 |
| | Seasoning (SAN LIKE*[2] amino-based UR (N)*[1]) | 3.0 | 3.0 |
| | Seasoning (SAN LIKE*[2] chicken consommé*[1]) | 3.0 | 3.0 |
| | Fermentation-derived cellulose complex preparation[Note 1] (polysaccharide) | 2.0 | — |
| | Xanthan gum (polysaccharide) | 0.1 | 0.1 |
| | Kappa-carrageenan (polysaccharide) | — | 0.25 |
| | Total with water | 100.0 | 100.0 |
| Seasoning oil | Olive oil | 92.0 | 92.0 |
| | Flavoring (basil SP-71887*[1]) | 8.0 | 8.0 |
| | Total | 100 | 100 |
| Oil content (%) | | 26.3 | 26.3 |
| Salinity (%) | | 12.1 | 12.1 |

TABLE 11

| | Liquid seasoning | | | | | | |
|---|---|---|---|---|---|---|---|
| | Oil droplet dispersion after tenfold dilution | Stability 121° C. after 20 minutes | Stability 20° C. after five months | Flavor | Viscosity (mPa·s) | Savoriness of pasta | Remarks |
| Example 5-1 | Poor | Excellent | Excellent | Excellent | 680 | Excellent | Oil was not separated after five months at 20° C. |

TABLE 11-continued

| | Liquid seasoning | | | | | | |
|---|---|---|---|---|---|---|---|
| | Oil droplet dispersion after tenfold dilution | Stability 121° C. after 20 minutes | Stability 20° C. after five months | Flavor | Viscosity (mPa · s) | Savoriness of pasta | Remarks |
| Comparative Example 5-1 | Poor | Poor | Poor | Poor | 800 | Poor | Flavor of pasta sauce was sharp and excellent. Savoriness of pasta was excellent. Oil was separated immediately after preparation. Accordingly, homogenous flavor was not obtained. |

The oil-in-water dispersion-type oil-containing liquid food (the pasta sauce) in Example 5-1 using a combination of the fermentation-derived cellulose complex and xanthan gum had a sharp and good flavor release without separation of the oil even after being stored for five months. Additionally, good release of savoriness was provided with pasta. On the other hand, Comparative Example 5-1 using a combination of xanthan gum and kappa-carrageenan had separation of the oil immediately after the preparation. Thus, the obtained pasta sauce did not have a uniform flavor.

Experimental Example 6

Preparation of Oil-in-Water Dispersion-Type Oil-Containing Liquid Food (Liquid Seasoning)

An oil-in-water dispersion-type oil-containing liquid food (liquid seasoning (liquid seasoning for a salad)) was prepared according to the formulation in Table 12. Specifically, substances other than oil were added to water at 80° C., and the mixture was stirred for 10 minutes at 6000 rpm. After the temperature of the mixture was decreased to room temperature, the oil was added, and the mixture was stirred for 10 minutes at 6000 rpm. After deaeration, the mixture was filled into a container to prepare an oil-in-water dispersion-type oil-containing liquid food (liquid seasoning).

After the obtained oil-in-water dispersion-type oil-containing liquid food was stored for one month at 20° C., the separation state of the oil, the flavor release property, and the viscosity were evaluated according to the evaluation criteria in Table 3. The results are shown in Table 13.

TABLE 12

| Formulation (pts.) | | Example 6-1 | Comparative Example 6-1 |
|---|---|---|---|
| Oil (vegetable edible oil) | | 40 | 40 |
| High fructose corn syrup | | 8 | 8 |
| Soy sauce | | 7 | 7 |
| Fermented vinegar | | 4 | 4 |
| Apple cider vinegar | | 4 | 4 |
| Lemon juice | | 4 | 4 |
| L-monosodium glutamate | | 0.5 | 0.5 |
| Polysaccharide | Fermentation-derived cellulose complex preparation [Note 1] | 1.0 | 1.0 |
| | Guar gum [Note 4] | 0.1 | 0.2 |
| Lecithin (surfactant) | | — | 0.3 |
| Total with water | | 100 | 100 |
| Oil content (%) | | 40 | 40 |
| Salinity (%) | | 1.1 | 1.1 |
| pH | | 3.6 | 3.6 |

[Note 4] VIS TOP*2D-20*1 is used

TABLE 13

| | Oil droplet dispersion after tenfold dilution | Stability (Separation of oil) | Flavor release property | Remarks | Viscosity (mPa · s) |
|---|---|---|---|---|---|
| Example 6-1 | Poor | Excellent | Excellent | Flavor release was sharp and excellent. | 615 |

TABLE 13-continued

|  | Oil droplet dispersion after tenfold dilution | Stability (Separation of oil) | Flavor release property | Remarks | Viscosity (mPa · s) |
|---|---|---|---|---|---|
| Comparative Example 6-1 | Good | Excellent | Poor | Flavor did not have sharpness, and flavor as a whole was mild. | 1,050 |

The oil-in-water dispersion-type oil-containing liquid food in Example 6-1 using a combination of the fermentation-derived cellulose complex and guar gum had a sharp and good flavor release; and further ensured good stability without separation of the oil after being stored for one month at 20° C., even in the case where surfactant was not contained. On the other hand, even in the case where a combination of the fermentation-derived cellulose complex and guar gum was used, the oil-in-water dispersion-type oil-containing liquid food in Comparative Example 6-1 with the addition of the surfactant (lecithin) lacked sharpness of flavor, and had an overly mild flavor as a whole.

Experimental Example 7

Preparation of Oil-in-Water Dispersion-Type Oil-Containing Liquid Food (Model System)

A model oil-in-water dispersion-type oil-containing liquid food was prepared according to the formulation in Table 14. Specifically, various polysaccharides or a polymer were added to water at 80° C. The mixture was stirred for 10 minutes at 1000 rpm with a four-bladed propeller. After soy sauce and flavor oil (chicken fat) were added, the mixture was stirred for five more minutes. Subsequently, the mixture was filled into a container to prepare an oil-in-water dispersion-type oil-containing liquid food (Examples 7-1 to 7-4 and Comparative Examples 7-1 to 7-4).

After the obtained oil-in-water dispersion-type oil-containing liquid food was stored for two weeks at 20° C., the separation state of the oil was observed according to the evaluation criteria in Table 3. The flavor was also evaluated after the oil-in-water dispersion-type oil-containing liquid food was diluted in a tenfold amount of boiling water. The results are shown in Table 15.

TABLE 14

| Formulation (pts.) | Example 7-1 | Example 7-2 | Example 7-3 | Example 7-4 | Comparative Example 7-1 | Comparative Example 7-2 | Comparative Example 7-3 | Comparative Example 7-4 |
|---|---|---|---|---|---|---|---|---|
| Soy sauce | 10 | 10 | 10 | 10 | 10 | 10 | 10 | 10 |
| Flavor oil | 60 | 60 | 60 | 60 | 60 | 60 | 60 | 60 |
| Fermentation-derived cellulose complex preparation $^{Note\ 1)}$ | 1.7 | 1.7 | 1.7 | 1.7 | 1.7 | 1.7 | 1.7 | 1.7 |
| Iota-carrageenan | 0.3 | — | — | — | — | — | — | — |
| Native gellan gum | — | 0.03 | — | — | — | — | — | — |
| Guar gum | — | — | 0.1 | — | — | — | — | — |
| Xanthan gum | — | — | — | 0.1 | — | — | — | — |
| CMC | — | — | — | — | — | 0.18 | — | — |
| Sodium polyphosphate | — | — | — | — | — | — | 0.18 | — |
| Galactomannan resolvent | — | — | — | — | — | — | — | 0.18 |
| Total with water | 100 | 100 | 100 | 100 | 100 | 100 | 100 | 100 |
| Oil content (%) | 60 | 60 | 60 | 60 | 60 | 60 | 60 | 60 |

TABLE 15

|  | Oil droplet dispersion after tenfold dilution | Stability (Separation of oil) | Flavor release property | Remarks | Viscosity (mPa · s) |
|---|---|---|---|---|---|
| Example 7-1 | Poor | Excellent | Excellent | Flavor release was sharp. Oil was not separated after storage for two weeks. | 1827 |

TABLE 15-continued

|  | Oil droplet dispersion after tenfold dilution | Stability (Separation of oil) | Flavor release property | Remarks | Viscosity (mPa · s) |
|---|---|---|---|---|---|
| Example 7-2 | Poor | Excellent | Excellent | Flavor release was sharp. Oil was not separated after storage for two weeks. | 1611 |
| Example 7-3 | Poor | Excellent | Excellent | Flavor release was sharp. Oil was not separated after storage for two weeks. | 1891 |
| Example 7-4 | Poor | Excellent | Excellent | Flavor release was sharp. Oil was not separated after storage for two weeks. | 1954 |
| Comparative Example 7-1 | Poor | Poor | Excellent | Flavor release was excellent, but first 3 cm of upper portion was separated after storage for two weeks | 1482 |
| Comparative Example 7-2 | Poor | Fair | Excellent | Flavor release was excellent, but first 0.8 cm of upper portion was separated after storage for two weeks | 1875 |
| Comparative Example 7-3 | Poor | Fair | Excellent | Flavor release was excellent, but first 0.5 cm of upper portion was separated after storage for two weeks | 1985 |
| Comparative Example 7-4 | Poor | Poor | Excellent | Flavor release was excellent, but 3 cm of upper portion was separated after storage for two weeks | 1500 |

Example 7-1 to Example 7-4 using a combination of the fermentation-derived cellulose complex and one of iota-carrageenan, native gellan gum, guar gum, and xanthan gum had good stability without separation of the oil, even after being stored for two weeks. Additionally, the flavor release was sharp and good. However, the fermentation-derived cellulose complex alone (Comparative Example 7-1) had good flavor release, but separation of the oil. Similarly, Comparative Example 7-2 to Comparative Example 7-4, using a combination of one of CMC, sodium polyphosphate, and galactomannan resolvent, had separation of the oil.

Experimental Example 8

Preparation of Oil-in-Water Dispersion-Type Oil-Containing Liquid Food (Liquid Seasoning)

An oil-in-water dispersion-type oil-containing liquid food (liquid seasoning (a pasta sauce)) was prepared according to the formulation in Table 16. Specifically, respective substances as seasoning liquid were added to water at 80° C. The mixture was stirred for 10 minutes at 1000 rpm with a four-bladed propeller. After a seasoning oil was prepared, the seasoning liquid and the seasoning oil were mixed together at a seasoning liquid:seasoning oil mixing ratio of 20:1. Subsequently, the mixture was filled into a container, and retort-sterilized at 121° C. for 20 minutes. After the obtained oil-in-water dispersion-type oil-containing liquid food was stored for five months at 20° C., the separation state of the oil and the flavor release property were evaluated. After 200 g of boiled pasta and 7 g of the oil-in-water dispersion-type oil-containing liquid food were mixed together, the savoriness of the cooked pasta was evaluated.

TABLE 16

| Formulation (pts.) | | Example 8-1 | Comparative Example 8-1 |
|---|---|---|---|
| Seasoning liquid | Salt | 17.0 | 17.0 |
| | Transparent lemon juice | 10.0 | 10.0 |
| | White wine extract (concentratd tenfold) | 3.0 | 3.0 |
| | White pepper | 2.0 | 2.0 |
| | Whole basil | 1.5 | 1.5 |
| | Seasoning (SAN LIKE*[2] amino-based UR (N)*[1]) | 3.0 | 3.0 |
| | Seasoning (SAN LIKE*[2] chicken consommé*[1]) | 3.0 | 3.0 |
| | Fermentation-derived cellulose complex preparation[Note 1] (polysaccharide) | 0.3 | — |
| | Xanthan gum (polysaccharide) | 0.1 | 0.1 |
| | Kappa-carrageenan (polysaccharide) | — | 0.25 |

TABLE 16-continued

| Formulation (pts.) | | Example 8-1 | Comparative Example 8-1 |
|---|---|---|---|
| | Total with water | 100.0 | 100.0 |
| Seasoning oil | Olive oil | 92.0 | 92.0 |
| | Flavoring (basil SP-71887*[1]) | 8.0 | 8.0 |
| | Total | 100 | 100 |
| Oil content (%) | | 4.4 | 4.4 |
| Salinity (%) | | 16.2 | 16.2 |

The oil-in-water dispersion-type oil-containing liquid food (the pasta sauce) in Example 8-1 using a combination of the fermentation-derived cellulose complex and xanthan gum had a sharp and good flavor release without separation of the oil, even after being stored for five months. Additionally, good release of savoriness was provided with pasta. On the other hand, Comparative Example 8-1, using a combination of xanthan gum and kappa-carrageenan, had separation of the oil after three days. Thus, the pasta sauce did not have a uniform flavor.

Test Example 1

The particle diameter of the oil droplet in the oil-in-water dispersion-type oil-containing liquid food of the present invention was confirmed in comparison with the surfactant-containing emulsified food.

TABLE 17

| | Sample A-1 (model of oil-in-water dispersion-type oil-containing liquid food of present invention) | Sample A-2 (model of surfactant-containing emulsified food) |
|---|---|---|
| Oil (vegetable edible oil) | 40 | 40 |
| Fermentation-derived cellulose complex preparation[Note 1] | 0.5 | — |
| Xanthan gum | 0.2 | — |
| Gum ghatti (surfactant) | — | 2 |
| Total with water | 100 | 100 |

(Preparation and Observation Method)

Sample A-1: 0.5% of preparation of the fermentation-derived cellulose complex and 0.2% of xanthan gum were added to water, and the mixture was stirred at 6000 rpm for 10 minutes. After addition of oil (edible vegetable oil), the mixture was further stirred at 6000 rpm for 10 minutes. After deaeration, the mixture was observed through an optical microscope.

Sample A-2: 2% of gum ghatti was added to water, and the mixture was stirred to be dissolved at 6000 rpm for 10 minutes. After addition of oil, the mixture was further stirred at 6000 rpm for 10 minutes. After deaeration, the mixture was observed through an optical microscope.

Sample B-1: Sample B-1 was obtained in the same manner as Sample A-1, except that the oil content was decreased to 5%. Oil droplet particles were observed.

Sample B-2: The oil content was decreased to 5%. Sample B-2 was obtained in the same manner as Sample A-2, except that the oil content was decreased to 5%. Oil droplet particles were observed.

(Microscope Used) Optical microscope: Nikon Eclipse E600, Magnification: 150×

FIG. 3 shows photomicrographs (bar scale=100 µm). The models of the oil-in-water dispersion-type oil-containing liquid food of the present invention (Samples A-1 and B-1) are shown on the top row. The models of the surfactant-containing emulsified food (Samples A-2 and B-2) are shown on the bottom row.

As is apparent from these models, the oil droplet in the model of the oil-in-water dispersion-type oil-containing liquid food of the present invention has a significantly larger particle diameter compared with the oil droplet in the model of the surfactant-containing emulsified food.

In the photomicrographs of the models of the oil-in-water dispersion-type oil-containing liquid food in FIG. 3, 100 oil droplets were randomly taken and measured with a digital ruler. The results are shown in Table 18 (magnification: 150×; region 700 µm×600 µm in actual size). On the other hand, as is apparent from the photograph, nearly all of the particle diameters are equal to or less than 5 µm in the model of the surfactant-containing emulsified food.

TABLE 18

| Oil 40% (average particle diameter 50 µm) | | Oil 5% (average particle diameter 35 µm) | |
|---|---|---|---|
| 120 to 130 µm | 1 particle | 100 to 110 µm | 3 particles |
| 110 to 120 µm | 3 particles | 90 to 100 µm | 3 particles |
| 100 to 110 µm | 2 particles | 80 to 90 µm | 2 particles |
| 90 to 100 µm | 5 particles | 70 to 80 µm | 3 particles |
| 80 to 90 µm | 8 particles | 60 to 70 µm | 6 particles |
| 70 to 80 µm | 9 particles | 50 to 60 µm | 11 particles |
| 60 to 70 µm | 18 particles | 40 to 50 µm | 14 particles |
| 50 to 60 µm | 15 particles | 30 to 40 µm | 24 particles |
| 40 to 50 µm | 14 particles | 20 to 30 µm | 20 particles |
| 30 to 40 µm | 10 particles | 10 to 20 µm | 6 particles |
| 20 to 30 µm | 8 particles | 5 to 10 µm | 8 particles |
| 10 to 20 µm | 4 particles | | |
| 5 to 10 µm | 3 particles | | |

The invention claimed is:

1. A method for producing an oil-in-water dispersion-type oil-containing liquid food, comprising:
   1) preparing a fermentation-derived cellulose complex by mixing fermentation-derived cellulose with a carboxymethyl cellulose salt, and then co-precipitating the mixture with first xanthan gum or first guar gum as a co-precipitant by using isopropyl alcohol as a precipitant; and
   2) mixing and stirring the fermentation-derived cellulose complex with oil, a salt, water, and a second polysaccharide that is at least one material selected from the group consisting of native gellan gum, second xanthan gum, iota-carrageenan, and second guar gum,
   wherein the fermentation-derived cellulose forms a three-dimensional network structure in the water phase,
   the resulting oil-in-water dispersion-type oil-containing liquid food comprises:
   (X) water;
   (Y) oil in an amount of 10-60 mass % relative to the liquid food; and
   (Z) the three-dimensional network structure consisting essentially of:
   (z1) the fermentation-derived cellulose, which has a fiber diameter in a range from 10 nm to 1 µm, and
   (z2) the first guar gum and the carboxymethyl cellulose salt as a first combination; or the first xanthan gum and the carboxymethyl cellulose salt as a second combination, the liquid food does not substantially comprise a surfactant, and an amount of the surfactant in the liquid food is less than or equal to a critical micelle concentration thereof, and droplets of the oil in the liquid food are stably dispersed in the water thereof.

2. A method for producing an oil-in-water dispersion-type oil-containing liquid food, comprising:

1) preparing a fermentation-derived cellulose complex by mixing fermentation-derived cellulose with a carboxymethyl cellulose salt, and then co-precipitating the mixture with first xanthan gum or first guar gum as a co-precipitant by using isopropyl alcohol as a precipitant; and 2) adding the fermentation-derived cellulose complex and a second polysaccharide that is at least one material selected from the group consisting of native gellan gum, second xanthan gum, iota-carrageenan, and second guar gum, to a non-dispersion-type oil-containing liquid food that comprises water and oil and in which the content of a surfactant is less than or equal to a critical micelle concentration thereof, wherein a three-dimensional network structure is formed in the non-dispersion-type oil-containing liquid food, the resulting oil-in-water dispersion-type oil-containing liquid food comprises:

(X) water;

(Y) oil in the amount of 10-60 mass % relative to the liquid food; and (Z) the three-dimensional network structure consisting essentially of:

(z1) cellulose having a fiber diameter in a range from 10 nm to 1 µm, and (z2) the first guar gum and the carboxymethyl cellulose salt as a first combination; or the first xanthan gum and the carboxymethyl cellulose salt as a second combination, the liquid food does not substantially comprise a surfactant, and an amount of the surfactant in the liquid food is less than or equal to a critical micelle concentration thereof, and droplets of the oil are stably dispersed in the water.

3. The method of claim 1, wherein an amount of the fermentation-derived cellulose in the oil-in-water dispersion-type oil-containing liquid food is in a range from 0.002 to 1 mass % relative to the oil-in-water dispersion-type oil-containing liquid food.

4. The method of claim 2, wherein an amount of the fermentation-derived cellulose in the oil-in-water dispersion-type oil-containing liquid food is in a range of 0.002 to 1 mass % relative to the oil-in-water dispersion-type oil-containing liquid food.

5. The method of claim 1, wherein the droplets of the oil in the oil-in-water dispersion-type oil-containing liquid food are not coated with micelles of the surfactant.

6. The method of claim 2, wherein the droplets of the oil in the oil-in-water dispersion-type oil-containing liquid food are not coated with micelles of the surfactant.

7. The method of claim 1, wherein an average diameter of the droplet of the oil in the oil-in-water dispersion-type oil-containing liquid food is in a range from 10 to 100 µm.

8. The method of claim 2, wherein an average diameter of the droplet of the oil in the oil-in-water dispersion-type oil-containing liquid food is in a range from 10 to 100 µm.

9. The method of claim 1, wherein a viscosity of the oil-in-water dispersion-type oil-containing liquid food, when measured with a BL rotational viscometer under a condition of 20° C. at a rotation speed of 60 rpm for one minute, is 2000 mPa·s or lower.

10. The method of claim 2, wherein a viscosity of the oil-in-water dispersion-type oil-containing liquid food, when measured with a BL rotational viscometer under a condition of 20° C. at a rotation speed of 60 rpm for one minute, is 2000 mPa·s or lower.

* * * * *